United States Patent [19]
Henderson et al.

[11] 3,920,092
[45] Nov. 18, 1975

[54] UTILITY VEHICLE

[75] Inventors: J. Craig Henderson; Thomas G. Teller; T. Herbert Morrell, all of Owatonna, Minn.

[73] Assignee: Owatonna Manufacturing Company, Inc., Owatonna, Minn.

[22] Filed: Dec. 9, 1974

[21] Appl. No.: 530,973

[52] U.S. Cl. ............... 180/6.48; 180/77 S; 296/64; 297/92
[51] Int. Cl.$^2$ ...................................... B62D 11/04
[58] Field of Search ......... 180/6.48, 6.2, 6.66, 77 S, 180/89 R; 296/65 R, 64; 297/92, 94, 250

[56] References Cited
UNITED STATES PATENTS

| | | | |
|---|---|---|---|
| 2,254,104 | 8/1941 | Joy | 180/6.2 |
| 3,198,276 | 8/1965 | Gordon | 180/77 S X |
| 3,279,637 | 10/1966 | Olson et al. | 180/6.48 X |
| 3,541,877 | 11/1970 | Houk | 180/6.48 |
| 3,570,614 | 3/1971 | Del Bagno | 180/77 S |

FOREIGN PATENTS OR APPLICATIONS

| | | | |
|---|---|---|---|
| 834,202 | 5/1960 | United Kingdom | 180/77 S |

*Primary Examiner*—Leo Friaglia
*Assistant Examiner*—John A. Pekar
*Attorney, Agent, or Firm*—Merchant, Gould, Smith, Edell, Welter & Schmidt

[57] ABSTRACT

A mobile frame elongated in the direction of travel thereof and supported by a pair of drive wheels at one end and a pair of laterally spaced casters at its other end. An engine mounted on the frame at one end drives the drive wheels through a power transmission mechanism, and control mechanism including a control bar operates to control rotation of the drive wheels individually as well as together, to effect steering of the vehicle as well as directional reversal thereof. An operator's seat is mounted selectively at opposite sides of the control bar and facing the control bar, so that the operator may face either end of the vehicle selectively. The control bar is movable between a pair of angularly displaced positions or ranges of movement to permit reversal of seat position.

7 Claims, 8 Drawing Figures

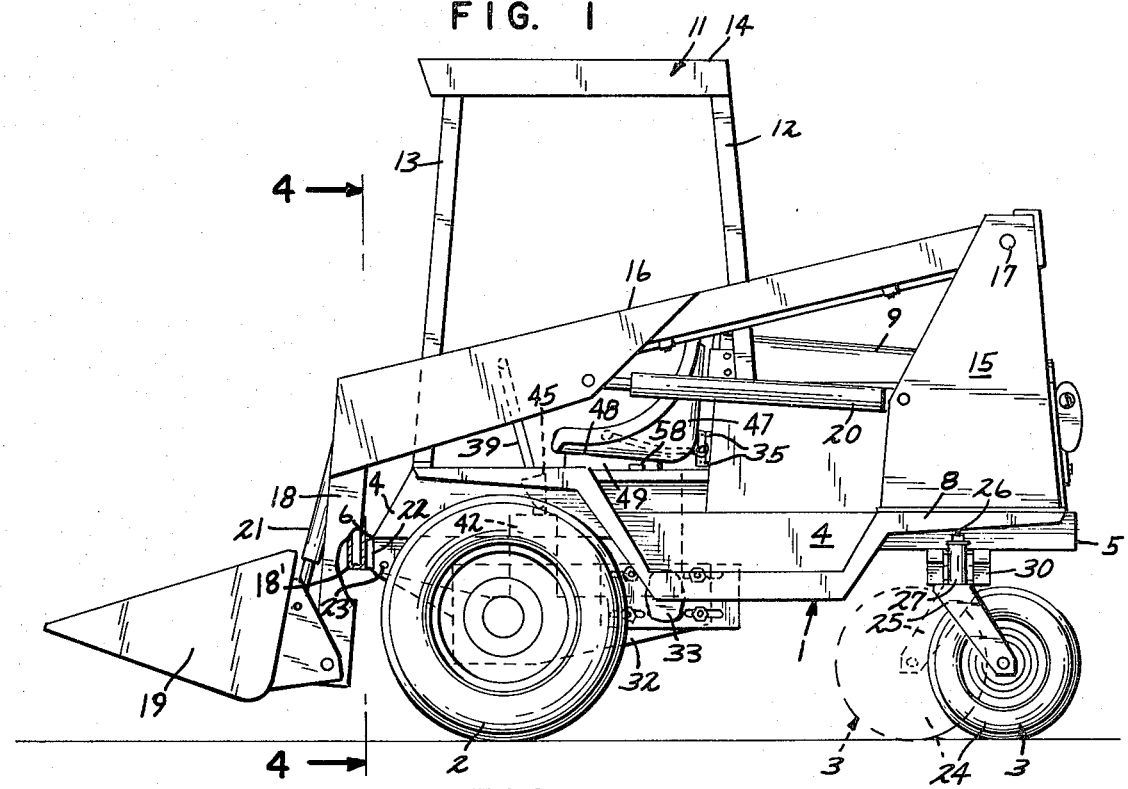

UTILITY VEHICLE

BACKGROUND OF THE INVENTION

This invention relates generally to vehicles commonly referred to as tractors, fork lifts, loaders, and the like, and more particularly to such vehicles having drive wheels that are individually controlled to effect steering by differential in speed or direction of rotation of the drive wheels. More specifically, this invention is in the nature of an improvement over other vehicles utilizing a pair of drive wheels at one end for driving and steering, and casters at the opposite end for support.

SUMMARY OF THE INVENTION

The vehicle of this invention involves a frame elongated in the general direction of movement of the vehicle, a pair of laterally spaced drive wheels at one end of the frame and a pair of laterally spaced casters underlying the opposite end of the frame and having means for mounting the same to the frame. An engine is mounted on one end of the frame, and power transmission mechanism, operated by the engine, is arranged to impart rotation to the drive wheels. Control mechanism for the transmission mechanism is operative to control the direction and speed of the drive wheels individually, and includes an operating member and a control bar member extending generally upwardly from the operating member. The control bar member has connections with the operating member selectively disposing the control bar member in a pair of angularly displaced positions relative to the operating member. An operator's seat is provided including means for mounting the seat in selected positions at opposite sides of the control bar member and reversible relative to the frame, so that the operator may face in a forward direction of movement depending upon the principal direction of movement of the vehicle, or which end of the frame is used primarily as the front end. Arrangements are provided at opposite ends of the frame for attaching various implements thereto.

BRIEF DESCRIPTION OF THE DRAWINGS

FIG. 1 is a view in side elevation of a vehicle produced in accordance with this invention, some parts being broken away;

FIG. 2 is a view in top plan, some parts being removed and some parts being shown in section;

FIG. 3 is a view in end elevation, as seen from the left to the right with respect to FIG. 1;

FIG. 4 is an enlarged view partly in end elevation, and partly in section, taken generally on the line 4—4 of FIG. 1, some parts being broken away;

FIG. 5 is a still further enlarged fragmentary section taken generally on the line 5—5 of FIG. 4;

FIG. 6, sheet 1, is a diagrammatic view of the drive and caster wheels, drive train and control mechanism of this invention;

DETAILED DESCRIPTION OF THE PREFERRED EMBODIMENT

Figure 7:
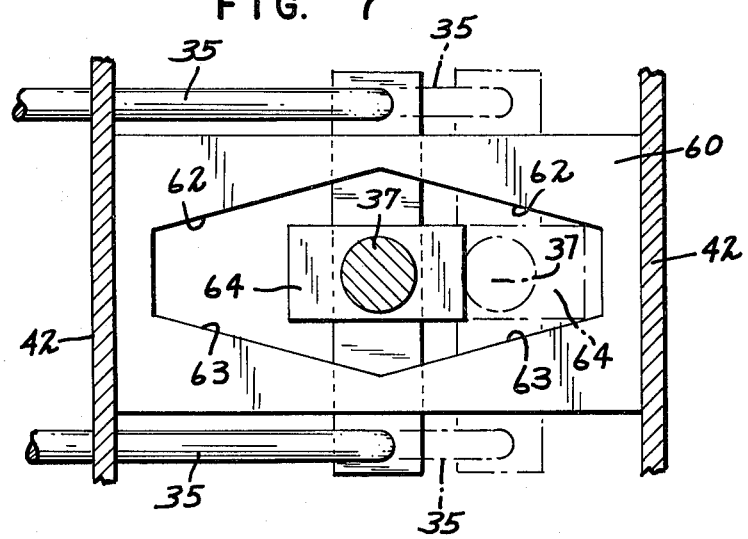
FIG. 7 is an enlarged detail in section, taken on the line 7—7 of FIG. 5.

The vehicle of this invention involves a generally rectangular frame 1 that is elongated in the general direction of travel of the vehicle, and supported adjacent one end by a pair of laterally spaced pneumatic tire equipped wheels 2 and adjacent its opposite end by a pair of laterally spaced casters 3. The frame 1 comprises a pair of laterally spaced longitudinal frame members 4, opposite end frame members 5 and 6, at least one intermediate cross frame member 7, shown in FIG. 5, and outer longitudinal members 8 which overlie the drive wheels 2 and casters 3 serve as fenders for the vehicle. A hood 9 at one end of the frame 1 encloses an engine 10 shown diagrammatically in FIG. 6 and an operator's cab 11 overlies the frame at its opposite end, the same being shown as including supporting legs 12 and 13, and a roof or canopy 14. The cab 11 further includes side walls, not shown.

A pair of pedestals 15 are each mounted on a different one of the outer frame members 8 at the end of the frame 1 overlying the casters 3, and extend upwardly therefrom. The pedestals 15 pivotally support one end of a pair of lifting booms 16, as indicated at 17 in FIG. 1, the booms 16 having downwardly extending portions 18 which support a scoop or bucket 19. The booms 16 are raised and lowered by fluid pressure operated rams 20, the bucket 19 being tilted with respect to the booms 16 by a pair of fluid pressure operated rams 21. A transverse plate 22 is carried by the end frame member for engagement with a cross bar 18' connecting the boom portions 18 to limit downward swinging movement of the boom. The frame members 4 are provided with mounting holes 23 used for the mounting of different implements or attachments, such as a fork lift mechanism, drilling equipment, mowing units, snowplows, or a draw bar, none of which is shown.

The casters 3 comprise a pair of caster wheels 24 journaled in forks 25 having generally vertically extended pivot shafts 25 that are journaled in normally vertically extending bearings 27 secured to opposite ends of a beam 28. The beam 28 extends transversely of the frame 1, and is pivotally secured generally centrally between its end, by means of a pivot bolt or shaft 29, to a transverse frame portion 30, for rocking movements of the beam 28 on a generally horizontal axis extending longitudinally of the frame 1. The pivotal connections between the forks 25 and bearings 27 permit the casters to partake of unlimited rotation on the axis of their respective pivot shafts 26, pivotal movement of the beam 28 on the axis of its pivot bolt or shaft 29 insuring contact of all of the wheels 2 and 24 with the ground during travel of the vehicle over uneven terrain.

The drive wheels 2 are supported by bearings 31 each mounted on one end of a different of a pair of housings 32 that are bolted or otherwise rigidly secured to the frame 1. The housings 32 contain drive gear, not shown, but which may be assumed to be operatively connected to a respective one of a pair of fluid pressure operated motors 33 mounted on each of the housings 32. With reference to FIG. 6, it will be seen that the motors 33 are coupled to respective ones of a pair of fluid pumps 34 drivingly coupled to the engine 10. For the purpose of the present example, it may be assumed that the pumps 34 are of the variable displacement variety, and are adapted to deliver fluid under pressure to their respective motors 33 to drive the same at varying speeds from zero to maximum in either direction of rotation. Reference is made to U.S. Pat. No. 3,792,744, assigned to the assignee company of this invention, wherein the pump and motor combination is more fully disclosed.

Means for controlling speed and direction of rotation of the drive wheels 2, includes a pair of control links 35 each connected at one end to a different one of a pair of control arms 36 of a different pump 34, a control operating member 37 being mounted thereon, a pair of transverse arms 38, and a control bar 39. As shown in FIG. 6, the links 35 are connected at their other ends to the outer ends of the transverse arms 38. The control structure thus far described includes yielding means, not shown, urging the control operating member 37 toward a generally vertically disposed neutral position, and stop elements limiting movement of the operating member 37 and links 35 in opposite directions, somewhat in the manner disclosed in U.S. Pat. No. 3,792,744. The control operating member 37 is in the nature of a shaft that is journaled for rotation on its own axis in a bearing 40 that is pivotally mounted in a bracket 41 for rocking movements on a generally horizontal axis extending transversely of the frame 1. The bracket 41 is suitably mounted in a channel member 42 extending transversely of the frame 1 and comprising a portion thereof.

The upper end portion of the control operating member or shaft 37 is provided with a pair of spaced transverse openings for reception of upper and lower shafts or bolts 43 and 44 respectively, these being parallel to the transverse axis of pivotal movement of the control operating shaft 37. At its lower end, the control bar 39 is provided with pair of laterally spaced downwardly extending flanges 45 which straddle the upper end portion of the operating shaft 37. At their lower ends, the flanges 45 are provided with aligned openings for reception of the lower pivot shaft or bolt 44 whereby the control bar 39 is mounted on the operating shaft 37 for swinging movements in directions generally longitudinally of the frame 1. Upwardly of their lower ends, each flange 45 defines a pair of laterally spaced openings 46, one of which is shown in FIG. 5, the openings 46 of one flange 45 being axially aligned with the respective opening 46 in the opposite flange 45. The openings 46 are so disposed that they may be aligned with the upper opening of the control operating shaft 37, for reception of the upper bolt or shaft 43, the arrangement being such that the control bar 39 may be selectively secured to the shaft 37 in a pair of positions angularly displaced generally longitudinally of the frame 1. This arrangement is shown by full and dotted lines in FIG. 5. As there shown, the operating member or shaft 37 is shown in a neutral position, as is the control bar 39 in both the full and dotted line positions thereof. Also, as indicated in FIG. 5, the control operating shaft 37 and control bar 39 are movable between forward and reverse positions in opposite directions from a neutral position, these movements controlling the speed and direction of rotation of the drive wheels 2, all as clearly described in the above-identified patent. By rotating the operating shaft 37 on its own axis, one of the drive wheels 2 may be caused to rotate at a different speed than the other thereof, or even in a reverse direction from the other, to impart steering movement to the vehicle. This steering movement may be very gentle, or sufficiently sharp to cause the vehicle to turn on an axis intersecting the axis of the drive wheels 2 intermediate the drive wheels. The wheels 24, being caster wheels, swivel to follow the direction of travel of the vehicle freely and without skidding.

An operator's seat 47 is rigidly mounted on a base 48 that extends generally transversely of the vehicle and at its opposite ends is formed to provide a pair of depending flanges 49 that are disposed between a pair of laterally spaced longitudinal frame portions 50. The frame portions 50 are provided with longitudinally spaced pairs of aligned openings 51 for reception of axially aligned anchoring pins 52 and 53. The anchoring pin 52 is rigidly secured to one of the flanges 49 and projects laterally outwardly therefrom, the anchoring pin 53 being of greater length than the pin 52 and axially slidably mounted in the opposite flange 49 and in a bracket 54 fixed to the base 48 laterally inwardly of the adjacent flange 49. Inwardly of the bracket 54, the anchoring pin 53 is formed to provide a handle portion 55 by means of which the operator may impart axial movement to the anchoring pin 53. Further, the pin 53 is formed intermediate its ends to provide a collar 56 which engages the adjacent flange 49 to limit axially outward movement of the anchoring pin 53, and a coil compression spring 57 is interposed between the collar 56 and the bracket 54 to yieldingly urge the anchoring pin 53 in a laterally outward direction toward the adjacent frame portion 50. A pair of support lugs 58 are welded or otherwise rigidly secured to the base flanges 49 and project laterally outwardly therefrom in spaced relation to the anchoring pins 52 and 53 generally longitudinally of the frame 1, the lugs 58 being adapted to rest on the top surfaces of the frame portions 50 or outer frame members 8, selectively.

As shown by full and dotted lines in FIG. 5, the seat 47 is adapted to be arranged selectively in opposed positions on the frame 1 and at opposite sides of the control bar 39. In operating conditions, where the end frame member 6 defines the front end portion of the vehicle, such as when used with the boom 16 and scoop or bucket 19, the operator's seat 47 is mounted so that the operator faces both the control bar 39 and end frame member 6, as shown in FIGS. 1 and 4 and by full lines in FIG. 5. With the seat 47 thus disposed, the control bar 39 is positioned relative to the control operating shaft 37 as shown by full lines in FIG. 5. On the other hand, when it is desired to use the vehicle as a towing vehicle with an implement connected to the draw bar 23, it is advantageous to shift the operator's seat 47 from its full line position of FIG. 5 to its dotted line position thereof. This is accomplished by retracting the anchoring pin 53 from its engaged opening 51 and swinging the seat 47 upwardly at the side thereof having the movable anchoring pin 53, as shown by an arrow 59 in FIG. 4. With the upwardly moving flange 49 being raised above the adjacent frame wall portion 50, the seat 47 may be moved laterally to disengage the fixed anchoring pin 52 from its frame opening 51. The seat may then be reversed and remounted in the frame, using the other pair of mounting holes or openings 51, the seat 47 being replaced in the frame 1 by first inserting the fixed pin 52 in its respective opening 51, retracting the movable anchoring 53 and swinging the seat and its base 48 downwardly to align the pin 53 with its respective opening 51. When the seat 47 is moved to its dotted line position of FIG. 5, the control bar 39 must be shifted to its dotted line position of FIG. 5, relative to the control operating shaft 37, so that the seat 47 does not interfere with proper operation of the control bar 39 and parts moved thereby. With the operator's seat 47 disposed in its dotted line position of FIG. 5, the casters 3 are disposed at the front end of the vehicle, and the operator is enabled to operate the vehicle while facing primarily in a forward direction. By moving the control bar 39 with respect to the control operating shaft 37, the length of the operator's compartment and consequently, the overall length of the vehicle, may be held to a minimum without sacrificing stability.

In a vehicle built in accordance with this invention, problems in control in steering have been experienced, these problems involving centrifugal and other inertia forces. These problems arise from the displacement of the center of gravity of the vehicle from the aligned axes of the drive wheels 2 toward the opposite end of the vehicle. When the vehicle is driven in a direction wherein the casters 3 are at the rear end of the vehicle, and a steering movement is applied to the control bar 39 to turn the vehicle away from a straight-line direction, centrifugal force sets up an oversteer condition which increases substantially with increase of forward speed of the vehicle. On the other hand, when the vehicle is driven in the opposite direction wherein the casters are at the front, inertia forces apply an understeer condition, the tendency of the vehicle being to travel in a straight line. This tendency also increases with increasing vehicle speed. The control mechanisms shown in FIGS. 5–8 overcome these steering problems, as will become apparent.

In the form of control mechanism illustrated in FIGS. 5–7, the hereinbefore mentioned stop elements are defined by a plate-like member 60 that is suitably mounted along the channel member 42 below the bracket 41, the member 60 having an opening 61 therein through which the control operating shaft 37 projects. The opening 61 is elongated in the general direction of rocking movements of the control operating shaft 37, and is formed to provide pairs of side edges 62 and 63 that converge from the longitudinally central portion of the opening 61 toward the opposite ends thereof. An abutment member 64 is mounted on the shaft 31 and projects therefrom generally toward the opposite ends of the opening 61, for common rocking and rotary steering movements with the shaft 37. As the control operating shaft 37 is moved in one direction or the other away from its neutral position, one end of the abutment member 64 moves toward the adjacent end of the opening 61 wherein the adjacent converging edges 62 and 63 approach the transverse width of the abutment member 64 to limit rotary steering movement of the shaft 37. Thus, as the speed of the vehicle increases in either direction, the limit of steering movement in either direction is decreased. Thus, at higher vehicle speeds in either direction, the turning radius of the vehicle is automatically increased to a point where the vehicle is stable and easily controlled. When the operator desires to turn on a small radius, or to turn the vehicle about on its own axis, the control operating shaft 37 must be moved toward its own neutral position.

Figure 8:
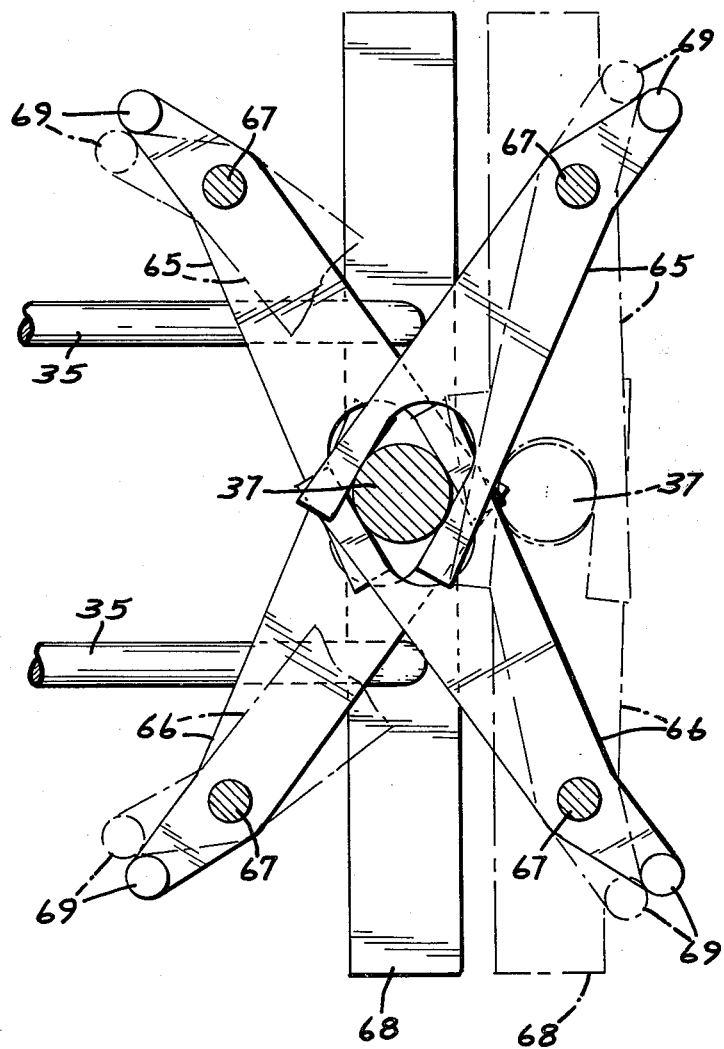
FIG. 8 is a view corresponding to FIG. 7, but showing a modified arrangement.

In the modified form of control mechanism shown in FIG. 8, pairs of bifurcated levers 65 and 66 are journaled on the frame by means of shafts 67 disposed on fixed axes. The inner bifurcated ends of the levers 65 and 66 are disposed to straddle the control operating shaft 37 just above a transverse arm 68 fixed on the shaft 37 and to which is secured the front ends of links 35. The outer ends of the levers 65 and 66 are formed to provide downwardly projecting fingers 69 that engage adjacent sides of the arm 68 to limit movement of the arm 68 and shaft 37 in either direction of rocking movement of the shaft 37 longitudinally of the vehicle. As shown by dotted lines in FIG. 8, when the arm 68 is moved to one limit of its movement, the fingers 69 of one pair of levers 65 and 66 engage an adjacent side of the arm 68 to limit its movement in a speed increasing direction. At this position of the arm 68, steering rotation of the shaft 37 will move one end of the arm 68 away from its engaged finger 69 to cause one of the fluid pressure operated motors 33 to decelerate at the same time, such turning of the shaft 37 will cause the same to be moved toward its neutral position, thus slightly slowing down the other motor 33, so that the vehicle is somewhat decelerated during the making of a turn. The mechanism of FIG. 8 works in substantially the same manner as that illustrated in FIGS. 5–7 so that, when the shaft 37 and arm 68 are in their neutral position shown by full lines in FIG. 8, the vehicle may be rotated on its own axis, and the vehicle is in a stable driving condition at all speeds and in either direction.

While we have shown and described a commercial embodiment of our utility vehicle, it will be understood that the same is capable of modification without departure from the spirit and scope of the invention, as defined in the claims.

1 claim:

1. A utility vehicle comprising:
  a. a frame elongated in the direction of movement of the vehicle;
  b. a pair of laterally spaced drive wheels at one end of the frame;
  c. a pair of laterally spaced casters;
  d. means mounting the casters on the opposite end of the frame;
  e. an engine mounted on the frame;
  f. power transmission mechanism operated by the engine for imparting driving rotation to the drive wheels;
  g. control means for the power transmission mechanism for controlling the direction and speed of rotation of the drive wheels individually and including an operating member and a control bar member extending upwardly from the operating member, said operating member comprising a shaft mounted in the frame for limited rotary steering movement on its own axis and for pivotal drive control movements on a generally horizontal axis extending transversely of said frame and between a generally vertical neutral position and drive position angularly displaced in opposite directions away from said neutral position;
  h. means connecting the control bar member to said operating member in a selected one of a pair of positions angularly displaced in directions generally longitudinally of the frame;
  i. an operator's seat;
  j. means mounting said seat on the frame selectively at opposite sides of said control bar member longitudinally of said frame and facing in opposite directions longitudinally of the frame, so that an operator on said seat is disposed to face the control bar member in either selected position of said seat;
  k. and means at opposite ends of said frame for attaching implements thereon.

2. The utility vehicle defined in claim 1 in which said means connecting said control bar member to the operating member comprises a pair of laterally spaced connector flanges on one of said members for reception of the other of said members therebetween, said flanges being pivotally connected to the other one of said members on an axis extending transversely of the frame, said other one of the members having a transverse opening therebetween in spaced parallel relationship to the axis of pivotal connection therebetween and said flanges, said flanges having laterally spaced pairs of aligned openings selectively alignable with said transverse openings responsive to relative pivotal movement between said members and screw means extending through said transverse opening and selected aligned openings in said flanges.

3. The utility vehicle defined in claim 1, in which said frame includes a pair of laterally spaced parallel frame portions extending longitudinally of the frame, said frame portions having longitudinally spaced pairs of aligned openings therein, said means for mounting the seat comprising a mounting base on said seat and a pair of axially aligned anchoring pins carried by said base and each receivable in selected ones of said openings in a different one of said frame portions.

4. The utility vehicle defined in claim 3 in which one of said anchoring pins is rigidly secured to said base, the other of said anchoring pins being axially movable relative to said base and frame portion toward and away from an aligned one of said openings in the frame portions, characterized by yielding means urging said movable pin toward reception in the frame opening therefor.

5. The utility vehicle defined in claim 1 in which said operating member comprises a shaft mounted in the frame for limited rotary steering movement on its own axis and for pivotal drive control movements on a generally horizontal axis extending transversely of said frame and between a generally vertical neutral position and drive positions angularly displaced in opposite direction from said neutral position, said control means further including an abutment member on said shaft and stop elements on said frame for engagement with said abutment member, said stop elements being disposed to progressively limit vehicle steering rotation of said shaft responsive to speed increasing rocking movement of said shaft.

6. The utility vehicle defined in claim 5 in which said control means includes a stop plate, said stop elements comprising pairs of stop edges on said plate converging in the direction of speed increasing movement of the control shaft and engagable with said abutment member responsive to steering rotation of said shaft.

7. The utility vehicle defined in claim 5 in which said control means includes pairs of levers pivotally mounted in said frame and having inner ends engaging said shaft to be moved thereby responsive to speed changing movement of shaft, said levers having stop fingers at their outer ends, the fingers of each pair of levers being movable toward engagement with said abutment member responsive to increasing pivotal movement of the shaft in a different direction from said neutral position.

* * * * *